A. F. BIONDI.
AUTOMATIC SIGNAL FOR AUTOMOBILES AND OTHER VEHICLES.
APPLICATION FILED SEPT. 24, 1915.

1,282,733.

Patented Oct. 29, 1918.
2 SHEETS—SHEET 1.

A. F. BIONDI.
AUTOMATIC SIGNAL FOR AUTOMOBILES AND OTHER VEHICLES.
APPLICATION FILED SEPT. 24, 1915.
1,282,733.
Patented Oct. 29, 1918.
2 SHEETS—SHEET 2.
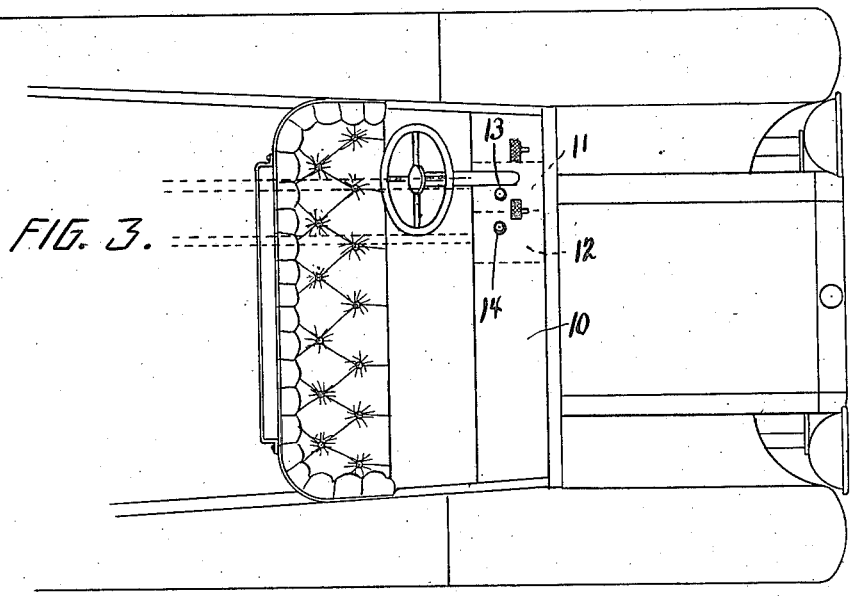
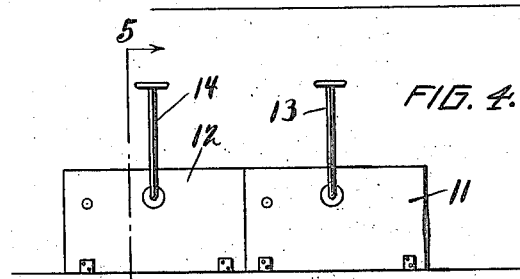
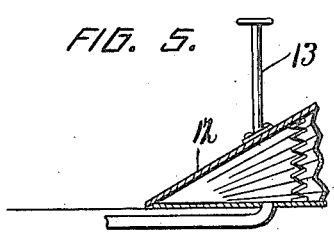
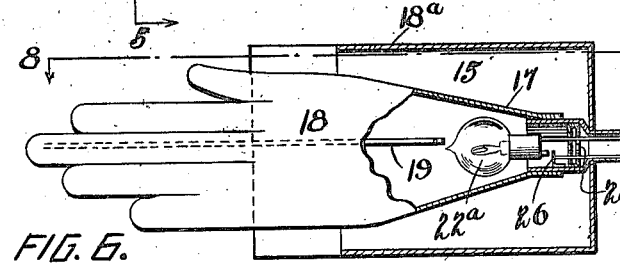
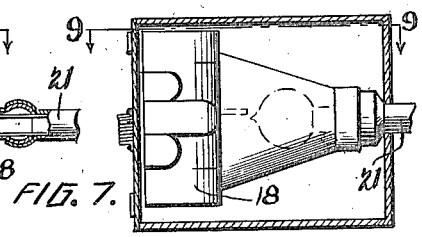
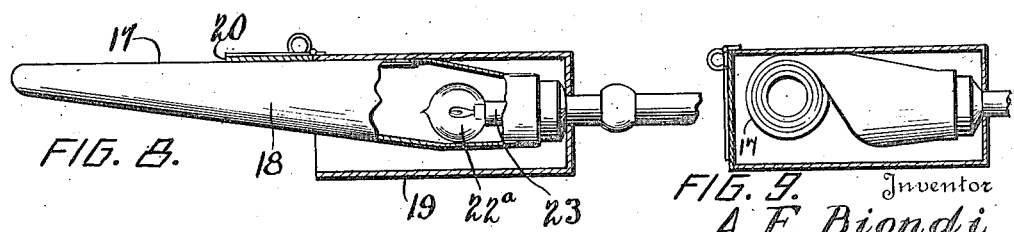
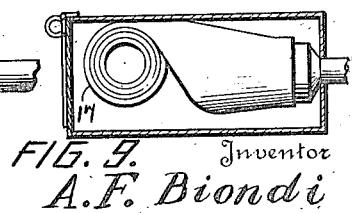
Inventor
A. F. Biondi
By Edson & Bernhard
Attorneys
Witnesses
W. F. Doyle
L. R. Fiedler

UNITED STATES PATENT OFFICE.

ANGELO F. BIONDI, OF NIAGARA FALLS, NEW YORK.

AUTOMATIC SIGNAL FOR AUTOMOBILES AND OTHER VEHICLES.

1,282,733.   Specification of Letters Patent.   Patented Oct. 29, 1918.

Application filed September 24, 1915. Serial No. 52,469.

*To all whom it may concern:*

Be it known that I, ANGELO F. BIONDI, a citizen of the United States, residing at Niagara Falls, in the county of Niagara and State of New York, have invented certain new and useful Improvements in Automatic Signals for Automobiles and other Vehicles; and I do hereby declare the following to be a full, clear, and exact description of the invention, such as will enable others skilled in the art to which it appertains to make and use the same.

This invention is an automatic signal, the same being especially adapted for use on automobiles, but it is not intended to restrict the application of the invention to this particular use, for the reason that it is apparent the signal may be used on vehicles generally and on other moving machines or structures.

It is well known that the traffic regulations of cities and other places require the drivers of moving machines to give a signal of one kind or another to a following vehicle, which signal indicates that the leading vehicle is about to come to a stop or to change the line of direction of its travel. Such precautions are in the interest of the drivers of the leading vehicle and the following vehicle as well as in the interest of pedestrians for the purpose of avoiding injury to the vehicles, their drivers, and pedestrians in the vicinity of the cars.

It is now the custom for the driver to hold out his hand in order to give the signal, but this practive is objectional from several standpoints, for the reason that it requires the hand to be taken off the steering wheel and frequently the signal is not observed by the occupant of the following vehicle.

The object of this invention is to enable the driver to give a signal at the rear of the vehicle in a manner which will notify the following vehicle that the leading vehicle is about to change its course, which signal cannot fail to be observed either in the day time or at night. The mechanism is easily operated without requiring the driver to throw out his hand or to remove it from the steering wheel, and, moreover, such mechanism is simple in construction, easily installed on vehicles generally, and is reliable in operation.

Broadly stated, the signal, proper, is a foldable or collapsible member composed of flexible material and adapted to be displayed by the influence of the medium employed for its operation. The signal is composed, either wholly or partially, of suitable material, such as rubber, oiled silk, or the like, and preferably it is coiled or rolled upon itself by the action either of a spring of one form or another or by exhausting air therefrom. Normally, the signal is not displayed and it is housed or incased within a suitable box, and when air is forced into it the signal automatically unfolds or uncoils and is projected from the incasing box, thus displaying the signal.

In practice two signals will be used, one to indicate that the vehicle is about to turn to the right and the other to indicate that it is to turn to the left. The two signals are, or may be, incased in one box centrally positioned at the rear of the vehicle, or in two boxes positioned on the respective sides of the vehicle, at the rear thereof.

The signals, preferably, are operated by air compressed by the action of bellows-like devices positioned usually below the foot board of an automobile, so as to be entirely out of the way and yet readily accessible by the driver. It is preferred to position the bellows-like devices for operation by foot pressure, although it is apparent that the devices, or their equivalents, may be operated by hand pressure. The two bellows-like devices are separately connected to the two inflatable signals, so that when the bellows is operated the proper signal will be displayed.

Provision is made for illuminating the signal in order to render it visible at night. This is accomplished by utilizing an electric lamp adapted to be supplied with current from any suitable source, such as a battery. When the signal is displayed the lamp illuminates the signal, the latter being more or less transparent so that the light will be plainly visible. Of course, means such as a switch may be employed to interrupt the lighting circuit in the day time.

I also provide means, such as a whistle, adapted to give an audible signal when the vehicle is to come to a stop or is to change its course, said audible signal or whistle serving to call the attention of the driver in the following vehicle to the fact that the leading vehicle is about to change its course and said audible signal being operated automatically by the mere operation of the bellows and without requiring special attention by the driver.

It is thus apparent that the invention embodies means for securing both a visual signal and an audible signal, and, further, the visual signal is illuminated at night.

Other features and advantages of the invention will appear from the following detailed description taken in connection with the drawings, wherein:—

Fig. 3 is a top view of the car to show the location of the bellows devices.

Fig. 4 is a front elevation of the bellows devices.

Fig. 5 is a cross section on the line 5—5 of Fig. 4.

Fig. 6 is a vertical section through the signal in a displayed condition.

Fig. 7 is a similar view with the signal in a non-displayed condition.

Fig. 8 is a section on the line 8—8 of Fig. 6.

Fig. 9 is a section on the line 9—9 of Fig. 7.

Figure 1:
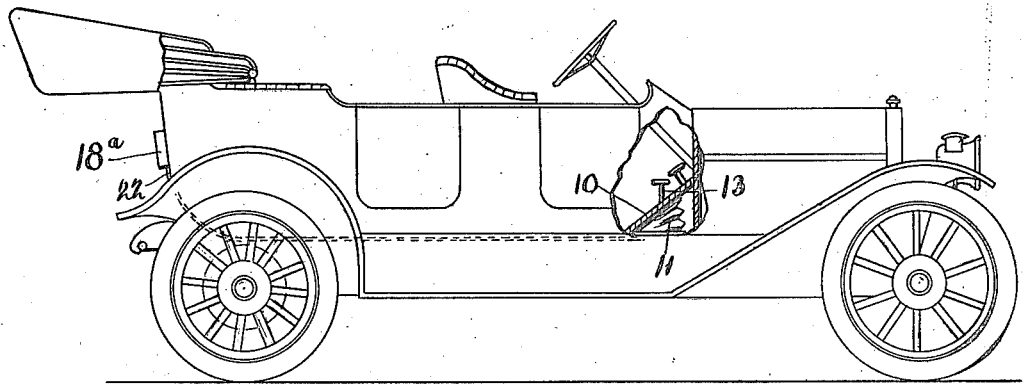
Figure 1 is a sectional elevation of my signal mechanism applied to a part of an automobile.
Figure 2:
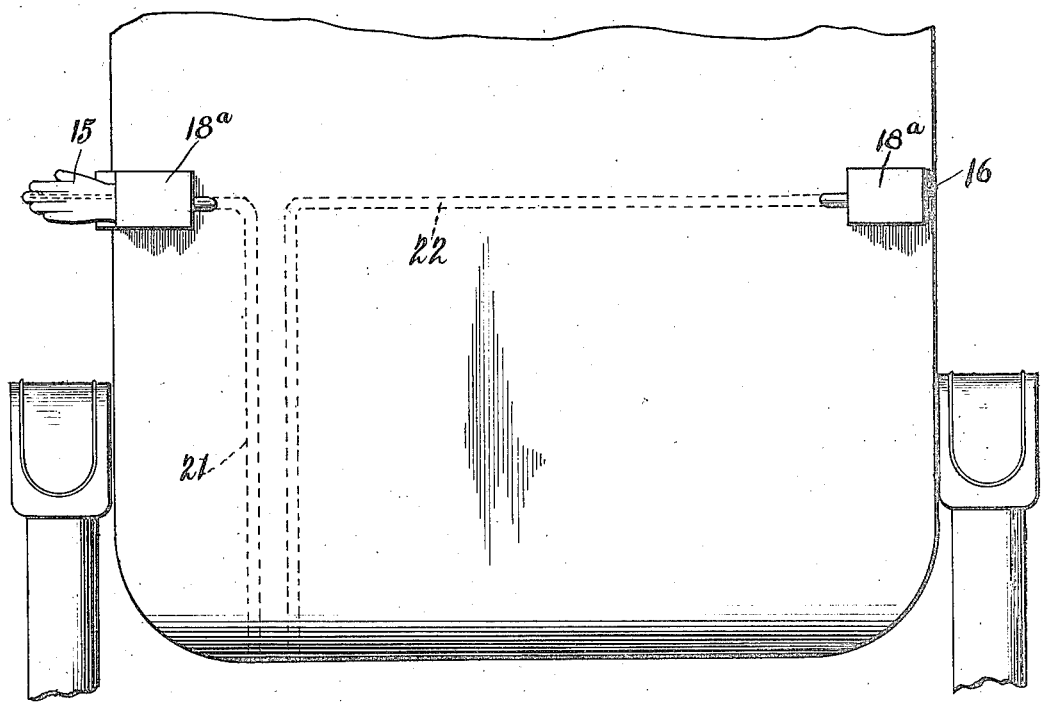
Fig. 2 is a rear elevation showing two signal devices.

In order that others may understand my invention, I have elected to show it applied to an automobile, wherein 10 designates the inclined foot board, through which work the usual pedal levers for controlling the driving clutch and the service brake.

Beneath the foot board are positioned the pneumatic device or devices for selectively operating the signal members to be presently described. Said pneumatic devices are indicated at 11, 12, each being shown in the form of a bellows comprising, as usual, a collapsible boxing composed in part of flexible material and normally distended by a spring, each bellows having an air inlet, as usual. With the two bellows devices are associated operating members such as the pedals 13, 14, the same being each shown as a stem attached to one bellows for moving the same against the tension of the bellows spring. The two operating members are positioned within convenient reach of the driver's foot, for which reason the two members 13, 14, are adapted to be operated by the foot which presses upon the clutch-pedal, but, if desired, the bellows levers may be positioned near to the brake pedal so as to be operated by the foot which normally works the service brake. Although I have shown two independent bellows, and have shown, also, pedal operated means, it is apparent that other forms of operating devices may be used, and, further, the operating devices may be controlled by means other than the pedal members 13, 14.

Positioned at the rear of the automobile are the signal members 15, 16, two of which preferably are employed. Each signal member is constructed to be inflated by air supplied under pressure from one of the bellows. As shown, each signal is composed of flexible material, the same being air tight in order to hold the air forced into it by the bellows. The form of the inflated signal which I have elected to show as one embodiment of the inventiotn embodies means for retaining the signal member in a collapsed condition, it being preferred to employ a spring, of one form or another, so arranged as to coil or roll the signal material into a compact condition when the signal is free from air pressure, whereby the signal is retained in a non-exposed condition.

Each inflatable signal member consists of a base 17 composed of suitable flexible material and a part 18 composed of material more flexible in nature than the base material 17, said material of the part 18 being more or less transparent, such as thin rubber, oiled silk, or the like. The base material 17 and the translucent material 18 are united to produce an air tight device, and with said device there is preferably associated a spring element 19 so applied to the signal member as to coil it into a compact collapsed condition when free from air pressure.

The signal member 15 or 16 may take any desired form, it being preferred to make one signal member in the form of a hand, although this form may be changed into a variety of shapes. The two signal members 15, 16, are arranged to work in different directions to each other, either horizontally or vertically; as shown, the hand of one signal is adapted when uncoiled to point toward the right, whereas the hand of the other signal is adapted to point toward the left.

Means are provided for supporting the signal members, and although it is not essential said means operate to incase the members in order to protect them from the weather, dust, etc. The incasing means for the signal members may be a single box 18ª centrally positioned on the rear of the car, the ends of the box being open for the two signal members to project therethrough when said signal members are uncoiled and they are thus adapted to be projected beyond the incasing means in order to display said signals. If desired, however, the two signals may be separately incased by suitable boxes, and said signals be positioned at the respective sides of the automobile, at the rear thereof. When collapsed, the signals are housed within the incasing means, and to further protect the signals, the open ends of the incasing means may be closed by flap doors 20, the latter being normally held closed by suitable means and said doors being yieldable to the pressure or impact of the signals as the latter are uncoiled by the operation of inflating the same.

The wrist portion of each inflatable signal member is fixedly supported in the incasing means, and to this fixed portion of the signal is attached one of the two tubes or pipes 21, 22, by which air is conveyed from the bellows 11, 12, to the signals, 15, 16, whereby said signals may be inflated. The pipes 21, 22, may consist of flexible tubes or rigid pipes, the same leading from the bellows at the front part of the car to the signals at the rear part of the car, and said tubes or pipes extending in any suitable manner beneath the body or floor of the automobile.

It is apparent that one bellows, as 11, is connected by a pipe 21 to one signal 15, whereas the other pipe 22 connects the other bellows 12 with signals 16. Now, when one bellows is operated the air compressed by the bellows is conveyed by the proper pipe to the signal for the purpose of inflating the same, whereupon the signal is uncoiled and moved into a displayed condition, being visible exteriorly of the incasing means. Provision is thus made for selectively operating the two signals, to indicate the change of direction of the vehicle, but when the pressure of the foot is removed from this bellows, then the latter is distended, whereupon the air suction from the bellows with or without the spring 19 causes the signal member to coil up into a compact bundle and to resume its normal non-displayed condition with or without the coöperation of the incasing means.

Means are provided for illuminating the signal during the night so as to render it visible to the driver of a following car. As shown, the illuminating means is a lamp 22ª, fixed to a socket 23 positioned in the wrist portion of each inflatable signal member; said lamp being provided preferably with a colored globe, such as a red globe, in order to render the lamp plainly visible and to afford illumination of a character which will attract attention. With the lamp there is associated means for cutting it out of service when the signal is coiled, and for automatically bringing the lamp into service when the signal is displayed. To this end, I have shown the lamp as an incandescent electric lamp supplied with electric current from a separate battery or with current from a storage battery forming a part of the usual car equipment. Of course, a switch should be provided at a convenient point in order to cut out the illumination during the day time.

I prefer to combine with each visual signal an audible signal device of one form or another, whereby attention is attracted to the display of the signal. As shown, the audible signal is a whistle or horn 28 positioned in the line of flow of air between the bellows and the signal, said whistle or horn being operated by the flow of air so as to give an audible alarm either before the display of the signal or simultaneously therewith.

Having thus described my invention, what I claim as new and desire to secure by Letters Patent of the United States is:—

1. In a signal for vehicles, the combination of an inflatable direction-indicating member, means for retaining the same normally in a coiled non-displayed condition, and means controllable at will for supplying an inflating medium to said direction-indicating member whereby it is uncoiled and distended at one operation, said normally-coiled member being a hand adapted to indicate the direction of turning movement of the vehicle.

2. In a signal for vehicles, the combination of a fixed supporting member, a collapsible direction-indicating member carried by said supporting member, means to house and conceal said direction indicating member, means for retaining said direction-indicating member in a coiled condition relatively to said supporting member so as to occupy normally a non-displayed position within the housing means, and means for inflating said collapsible direction-indicating member so as to uncoil it relatively to the supporting member, said normally-coiled member being in the form of a hand adapted when distended to indicate the direction of turning.

3. In a signal for vehicles, the combination of a fixed supporting member, a collapsible direction-indicating member attached to said supporting member, means connected with the direction-indicating member for coiling it in a compact condition with respect to said supporting member to prevent its observation as a signaling device, incasing means for the supporting member and the direction-indicating member, and means for inflating said direction-indicating member whereby it is distended and uncoiled relatively to the supporting member so as to be displayed exteriorly to the incasing means in a distended visible condition upon a vehicle, said direction-indicating member being in the form of a hand adapted when distended to indicate the direction of turning.

4. In a signal for vehicles, the combination of a collapsible direction-indicating member in the form of a hand adapted when distended to indicate the direction of turning, incasing means therefor, means connected with said direction-indicating member for retaining the same in a coiled compact condition within said incasing means, and means for inflating said direction-indicating member for uncoiling it and for projecting the same exteriorly to the incasing means by the uncoiling operation so as to display the direction-indicating member in a distended visible condition upon a vehicle.

5. In a signal for vehicles, the combination of incasing means, a hollow direction-indicating member composed of flexible and semi-transparent material, said member being in the form of a hand adapted when distended to indicate the direction of turning, means for retaining said direction-indicating member in a coiled condition and within said incasing means, means for illuminating said direction-indicating member, and means for inflating said direction-indicating member so as to uncoil the same relatively to the incasing means and to display the same in a distended and illuminated condition exteriorly to the incasing means.

6. In a signal for vehicles, the combination of incasing means, a hollow direction-indicating member composed of flexible material supported at a fixed point relatively to the incasing means, means for coiling the direction-indicating member upon itself and retaining the same in a non-displayed condition within the incasing means, and pneumatic means for supplying an inflating medium to the hollow direction-indicating member so as to uncoil it relatively to the fixed supporting point and to project said member in a distended condition exteriorly to the incasing means, said direction-indicating member being in the form of a hand adapted when distended to indicate the direction of turning.

7. In a signal for vehicles, the combination of incasing means, a hollow direction-indicating member composed of flexible semi-transparent material supported at a fixed point within said incasing means, said hollow member being in the form of a hand adapted when distended to indicate the direction of turning, means for coiling the material of said direction-indicating member upon itself and retaining the same in a non-displayed condition within the incasing means, illuminating means positioned within the semi-transparent material of said direction-indicating member, and means for inflating said direction-indicating member so as to uncoil it relatively to the illuminating means and to display the same in a distended illuminated condition exteriorly to the incasing means.

8. In a signal for vehicles, the combination of incasing means provided with a yieldable door, a direction-indicating member normally concealed by said incasing means, means for retaining the direction-indicating member in a coiled condition within said incasing means, and means for inflating the direction-indicating member so as to uncoil it and project the same exteriorly to the incasing means the door of which is opened by the operation of uncoiling said member, said direction-indicating member being in the form of a hand adapted when distended to indicate the direction of turning.

9. In a signal for vehicles, the combination of incasing means, a plurality of inflatable direction-indicating members each supported at a fixed point within said incasing means, means coöperating with each direction-indicating member for coiling the same upon itself and retaining the same in a compact coiled condition within said incasing means, and means controllable at will for selectively operating said direction-indicating members, said means operating to supply an inflating means to one or the other of said direction-indicating members so as to uncoil the same relatively to the incasing means and thereby move the direction-indicating members into exposed positions exteriorly to the incasing means, each of said direction-indicating members being in the form of a hand adapted when distended to indicate the direction of turning.

10. In a signal for vehicles, the combination of incasing means, a plurality of inflatable direction-indicating members each supported at a fixed point within said incasing means, said direction-indicating members being movable in opposite directions relatively to each other and adapted to be displayed at the respective ends of said incasing means, means coöperating with each direction-indicating member for coiling the same upon itself and retaining the same in a compact non-displayed condition within the incasing means, and pneumatic means controllable at will for inflating the direction-indicating members and uncoiling the same relatively to the incasing means, each of said direction-indicating members being in the form of a hand adapted when distended to indicate the direction of turning.

11. In a signal for vehicles, the combination of incasing means, a plurality of inflatable direction-indicating members each supported at a fixed point within said incasing means, said direction-indicating members being movable in opposite directions relatively to each other and adapted to be displayed at the respective ends of said incasing means, means coöperating with each direction-indicating member for coiling the same upon itself and retaining the same in a compact non-displayed condition within the incasing means, illuminating means positioned within the incasing means and pneumatic means controllable at will for selectively inflating the direction-indicating members and operating to uncoil the same relatively to the incasing means so as to display the direction-indicating members in a distended illuminated condition exteriorly to the incasing means, each of said direction-indicating members being in the form of a hand adapted when distended to indicate the direction of turning.

12. In a signal device for vehicles, the combination of incasing means having a yieldable door, a direction-indicating member normally concealed by the incasing means, said direction indicating member being composed of flexible semi-transparent material and having a metallic coiled strip positioned interiorly thereof normally to maintain the indicating member in a coiled condition to conceal the same within the incasing means, pneumatic means to inflate the indicating member to uncoil the same and force said member past the yieldable door to its distended signaling position, and an audible signal device adapted to be sounded by the pneumatic means simultaneously with the distention of the coiled direction indicating member.

In testimony whereof I affix my signature.

ANGELO F. BIONDI.